Feb. 17, 1970   G. F. MELLOY ETAL   3,496,326
METHOD OF WELDING COATED STEEL
Filed July 30, 1965   6 Sheets-Sheet 1

INVENTORS
George F. Melloy
Enos H. Brubaker

INVENTORS
George F. Melloy
Enos H. Brubaker

Feb. 17, 1970  G. F. MELLOY ETAL  3,496,326
METHOD OF WELDING COATED STEEL
Filed July 30, 1965  6 Sheets-Sheet 4

INVENTORS
George F. Melloy
Enos H. Brubaker

Feb. 17, 1970     G. F. MELLOY ETAL     3,496,326
METHOD OF WELDING COATED STEEL

Filed July 30, 1965     6 Sheets-Sheet 5

INVENTORS
George F. Melloy
Enos H. Brubaker

INVENTORS
George F. Melloy
Enos H. Brubaker

United States Patent Office 3,496,326
Patented Feb. 17, 1970

3,496,326
METHOD OF WELDING COATED STEEL
George F. Melloy and Enos H. Brubaker, Bethlehem, Pa., assignors to Bethlehem Steel Corporation, a corporation of Delaware
Filed July 30, 1965, Ser. No. 476,037
Int. Cl. B23k 9/02, 11/02, 11/04
U.S. Cl. 219—104                                     11 Claims

ABSTRACT OF THE DISCLOSURE

A method of producing a corrosion resistant weld joint along the edge of a steel sheet having a corrosion resistant coating said method consisting of increasing the proportion of the coating to the base at the welding edge of the sheet prior to resistance welding.

---

This invention pertains to a method of joining the edges of steel sheets having a corrosion resistant metallic coating to produce a product having a corrosion resistant joint. More specifically this invention is directed to a method of producing a coated weld joint which has corrosion resistance comparable to that of the original coated steel sheets.

The process of joining steel sheets by resistance welding is well known but the process is not applicable to simple carbon steel sheets having a thin coating of a corrosion-resistant metal, due to the loss of corrosion resistance at the location of the weld. The loss in corrosion resistance is due to the exposure of the base metal occurring during the forging step of the resistance welding process. One example of a coated steel sheet whose utility is currently limited in this manner is commonly known as chromized sheet produced, for example, by diffusing chromium into the surface of low carbon steel sheet.

The principal object of this invention is to provide a method of resistance welding steel sheets having a corrosion resistant metal coating that will result in a welded product having corrosion-resistance comparable to the original coated sheets.

Another object of this invention is to provide a method of resistance welding steel sheets that have been coated with a high melting point, corrosion resistant metal in which the weld joint is protected by a coating of a metal having a composition similar to that of the coating on the sheets.

Still another object is to provide a method of chromium coating a resistance weld.

Still another object is to provide a new method of forming a butt weld.

Still another object is to provide a new method of forming a lap weld.

Still another object is to provide uniform resistance to corrosion in a metallic coated sheet steel product containing a resistance weld.

These and other objects are accomplished in the present invention by providing methods by which the weld joint is coated with a corrosion-resistant metal during and as a part of the welding operation in the manner described more fully hereafter.

Figure 1A:
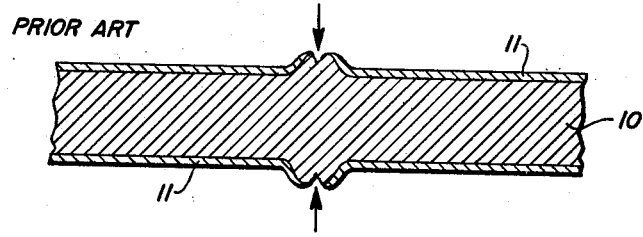
FIG. 1a is a drawing and FIG. 1b is a photomicrograph of an etched cross-section through a butt weld produced by conventional resistance welding of two adjacent edges of a chromized steel sheet.
Figure 2A:
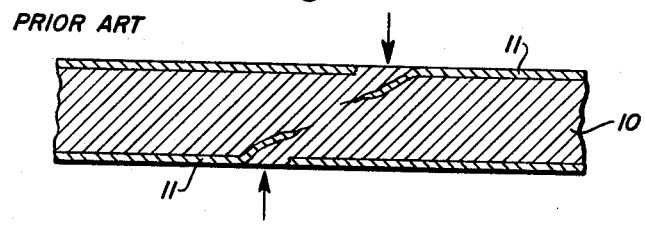
FIG. 2a is drawing and FIG. 2b is a photomicrograph of an etched cross-section through a resistance lap weld produced by conventional mashed seam welding of two overlapping edges of a chromized steel sheet.
Figure 1B:
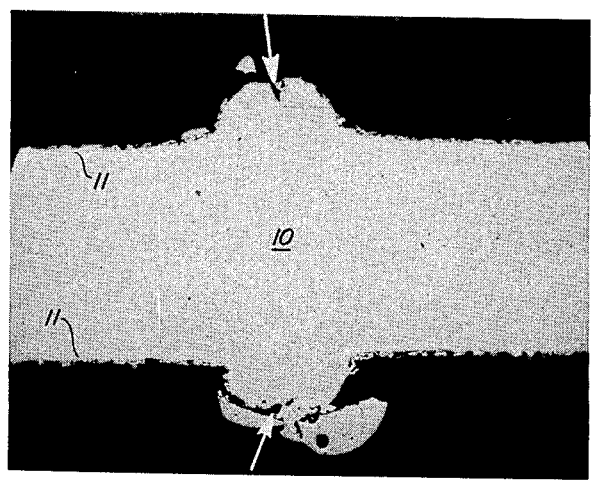
Figure 2B:
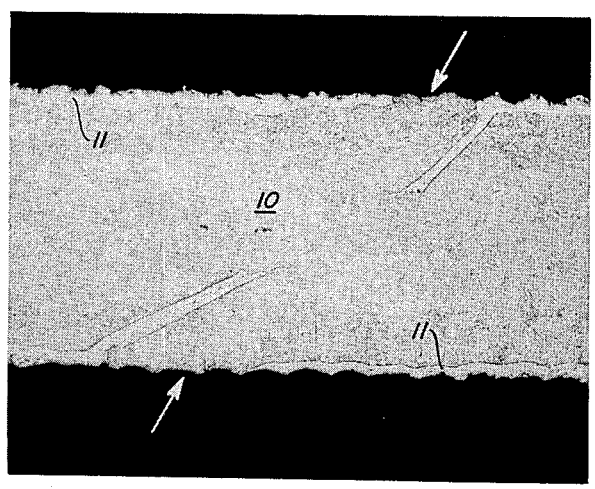

As shown on FIG. 1a and FIG. 1b, conventional resistance butt welding of steel sheets 10, having a corrosion resistant metallic coating 11 thereon, results in the base metal being extruded from the joint during the upsetting operation, producing a butt weld joint in which the base metal is exposed at the locations indicated by the arrows. In a similar manner FIGS. 2a and 2b illustrate that conventional resistance lap welding of steel sheets 10, having a corrosion resistant metallic coating 11 thereon, also results in extrusion of the base metal and produces a lap weld in which the base metal is exposed at the locations indicated by the arrows. This results in a serious reduction in the usefulness of this method of welding for corrosion resistant applications.

Figure 3:
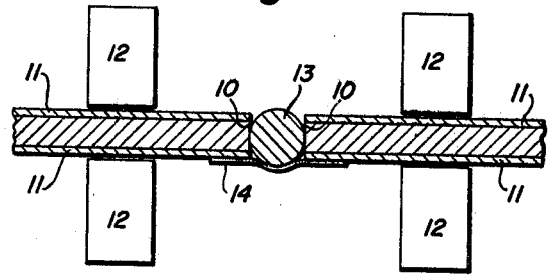
FIGS. 3, 4 and 5 are drawings illustrating three of the resistance butt welding methods of this invention identified as Species A, B and C.

FIG. 3 illustrates the Species A method of practicing this invention. In FIG. 3, the numerals 10 represent the adjacent edges of two carbon steel sheets, each having a chromized coating 11 on both sides thereof, positioned in the jaws 12 of a conventional flash welder. Between the edges of the sheets 10 and extending along the length of the edges to be joined is placed a stainless steel wire 13 which is supported by masking tape 14. The assembly is then flash welded. In the welding operation the edges of the sheets 10 and the wire 13 are brought to welding temperature. When the edges are brought together by the machine the material of the wire is extruded from between the weld joint and overlies and adheres to the butt joint.

Figure 8:
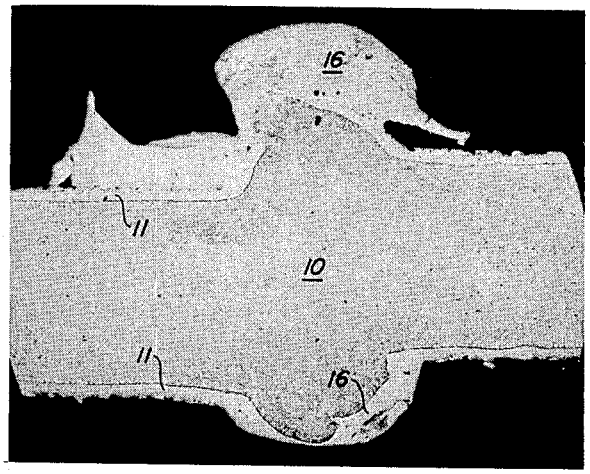
FIGS. 8, 9 and 10 are photomicrographs of etched sections similar to FIG. 1b illustrating resistance butt welds of metallic coated steel sheets made by the Species A, B and C of our invention as illustrated on FIGS. 3, 4 and 5.

FIG. 8 shows a cross section of a butt weld joint made in accordance with the process above described, and it will be observed that the weld joint is coated with a stainless steel coating 16 similar to that of the sheets themselves, thus producing a weld joint having corrosion-resistant properties comparable to those of the sheets.

Figure 4:
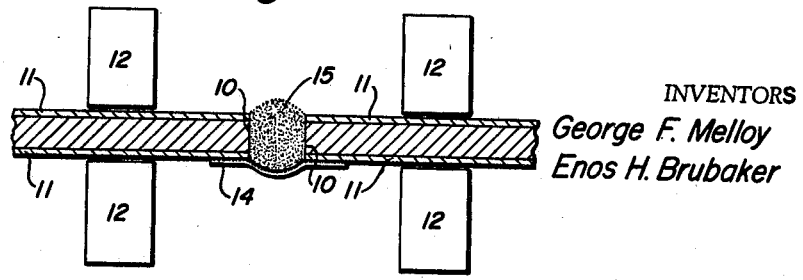

The Species B of butt welding by the method of this invention as illustrated by FIG. 4 is in all respects similar to that of FIG. 3 except that ferrochrome powder 15 is substituted for the wire 13 of FIG. 3. The ferrochrome powder 15 is supported by masking tape 14, secured to the bottom of sheets 10 and bridging the gap between them in the same manner as FIG. 3. In the flash butt welding operation the edges of the sheets 10 each having a chromized coating 11 on both sides thereof and the ferrochrome powder 15 are brought to welding temperature. When the edges of the sheets 10 are brought together the ferrochrome is extruded from between the weld joint and adheres to the butt weld joint.

Figure 9:
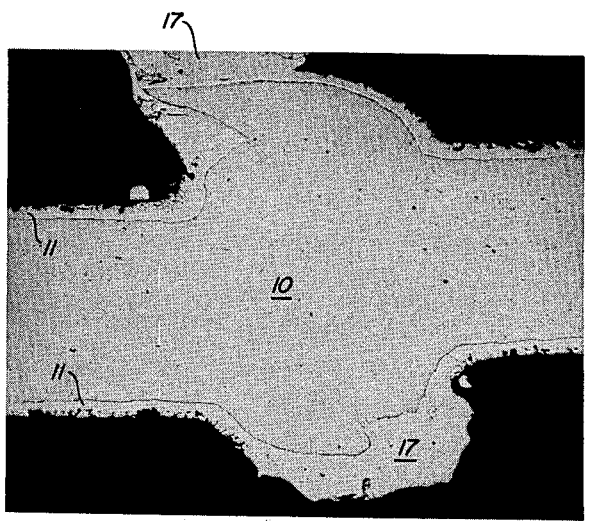

FIG. 9 shows an etched cross section of a joint made in accordance with the above described process, and it will be observed that the butt weld joint is covered with a coating 17 of ferrochromium similar to that of the sheets, thus producing a weld joint having corrosion resistant properties comparable to those of the coated sheets.

Figure 5:
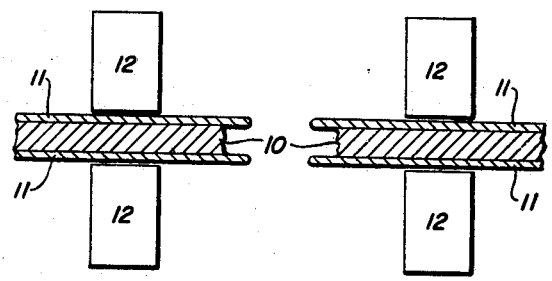

Species C of butt welding by the method of this invention as illustrated by FIG. 5 is similar to Species A and B of FIGS. 3 and 4 except that the proportion of the corrosion resistant coating metal 11 to the base metal 10 of the sheets has been increased by etching with acid to leave the coating 11 essentially intact while removing a portion of the base metal 10 along the edge of the sheet. FIG. 5 also illustrates the profile of the edge of a sheet etched in boiling 20% nitric acid for 90 seconds to provide 1/32" relief. In the flash welding operation, the etched edges of the sheets 10 and the coating 11 are brought to welding temperature and when the edges are brought together the coating material 11 adheres to and overlies the butt weld joint.

Figure 10:
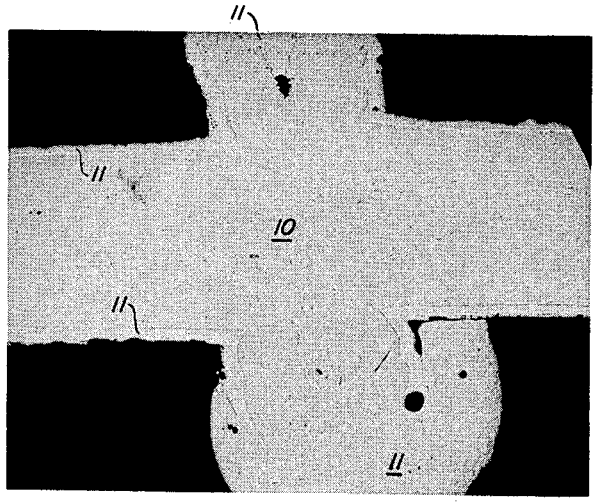

FIG. 10 shows an etched cross section of a butt weld joint made in accordance with the above described process and it will be observed that the weld is covered with a coating 11 similar to that of the sheets, thus producing a butt weld joint having the same corrosion resistant properties as those of the coated sheets.

Figure 6:
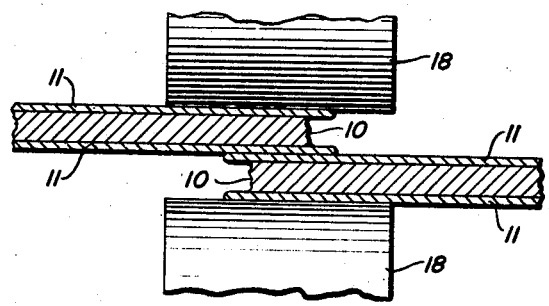
FIGS. 6 and 7 are drawings illustrating two of the resistance lap welding methods of this invention identified as Species D and E.

FIG. 6 illustrates lap welding by the method of Species D of this invention in which the edges of the chromized sheets have been profiled by acid etching in the same manner as in Species C. The edges of the 20 gage profiled sheets, wherein the proportion of the coating 11 to the base metal 10 has been increased, are placed together in a manner that results in the base metal being overlapped approximately 1/16" and the overlap is passed between two rotating wheels 18 providing pressure while serving as electrodes to produce a series of overlapping spot welds along the length of the overlap in accordance with the well known mashed seam welding technique.

Figure 11:
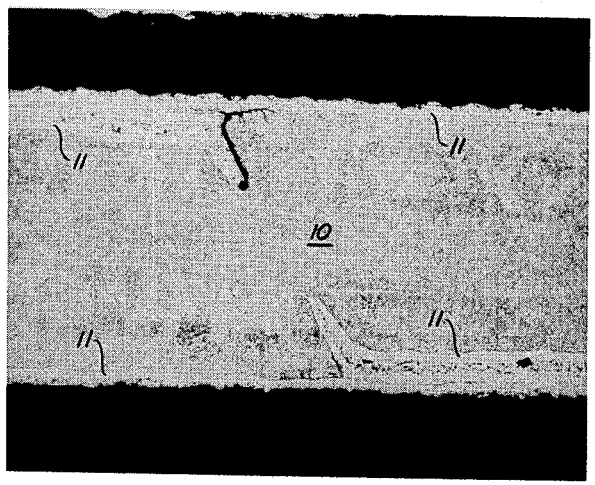
FIGS. 11 and 12 are photomicrographs of etched sections similar to FIG. 2b illustrating resistance welds produced by mashed seam welding of overlapped edges of metallic coated steel sheets made by the Species D and E of our invention as illustrated on FIGS. 6 and 7.

FIG. 11 shows a cross section of a mashed seam weld made in accordance with the process of Species D and it will be observed that the lap weld is covered with a coating of the chromium 11 which is essentially the same as the coating on the chromized sheets.

Figure 7:
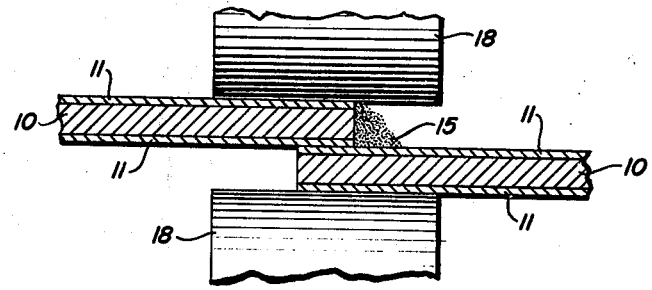

FIG. 7 illustrates lap welding by the method of Species E of this invention in which sheared edges of chromized sheets have had the proportion of the coating 11 to the base metal 10 increased by adding ferrochromium powder 15 to the edge of the upper sheet which overlaps the bottom sheet by approximately 1/16". The overlapped edges are passed between the rotating wheels 18 to produce a mashed seam weld in the same manner as in Species D.

Figure 12:
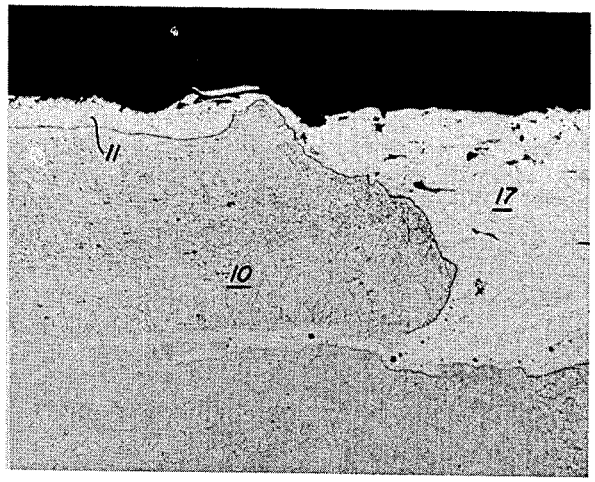

FIG. 12 shows a cross section of the top half of a mashed seam weld made in accordance with the process of Species E and it will be observed that the lap weld is covered with a coating of ferrochromium 17 which is essentially the same as the coating on the chromized sheets.

The two low carbon steel compositions shown in Table I have been found to provide a satisfactory base for the production of chromized steel sheets:

TABLE I.—STEEL SHEET COMPOSITIONS

|  | C | Mn | P | S | Si | Ti | Al |
| --- | --- | --- | --- | --- | --- | --- | --- |
| Decarburized steel | .002 | .30 | .008 | .005 | .01 | | |
| Titanium steel | .06 | .31 | .008 | .005 | .01 | .38 | .017 |

The compositions shown above and all subsequent compositions are on the basis of percentage by weight.

The two compositions of powdered ferrochromium shown in Table II have been found to provide a satisfactory source of chromium for diffusing onto the surface of the low carbon steel sheets.

TABLE II.—POWDERED FERROCHROMIUM COMPOSITIONS

| Type | C | Mn | Si | Cr | Balance |
| --- | --- | --- | --- | --- | --- |
| A | .02 | .3/.5 | 1.45 | 68.0/72.0 | Essentially iron. |
| B | .04 | .3/.5 | .44 | 68.0/72.0 | Do. |

The coating on chromized steel sheets approximates .002" in thickness and the chromium concentration at the surface of the coating is approximately 30%. The results of tensile tests on chromized steel sheets are equivalent to the results obtained on uncoated steel sheets, approximately 46,500 p.s.i., and chromized sheets can be subjected to a 180° flat bend test without cracking the coating.

Stainless steel wire having a 1/16" diameter and of the compositions shown in Table III have been found to be satisfactory in the species of flash welding illustrated in FIG. 3.

TABLE III.—STAINLESS STEEL COMPOSITIONS

| A.I.S.I. type | Maximum | | | Ni | Cr | Balance |
| --- | --- | --- | --- | --- | --- | --- |
| | C | Mn | Si | | | |
| A310 | .25 | 2.00 | 1.5 | 19.0/22.0 | 24.0/26.0 | Essentially iron. |
| A430 | .12 | 1.00 | 1.0 | | 14.0/18.0 | Do. |
| A446 | .2 | 1.50 | 1.0 | | 23.0/27.0 | Do. |

Either of the two compositions of powdered ferrochromium shown in Table II have been found to be satisfactory in Species C of flash welding illustrated in FIG. 4 and the Species E of lap welding illustrated in FIG. 7.

Conventional flash welding and flash welding in accordance with Species A, B and C of this invention were carried out with 20 gage, chromized sheets on a standard single phase 50 kv.-a., 60 cycle, A.C. flash welding machine. All welds were produced by starting with a 5/16" initial die opening, 1/8" flash off and the variables as shown in Table IV.

TABLE IV.—FLASH WELDING VARIABLES

| Method of flash welding | Final Die Opening | Flashing time (sec.) | Upset |
| --- | --- | --- | --- |
| Conventional | 5/32"–3/64" | 1.5 | 1/32"–3/64" |
| Species A | 5/32" | 2.0 | 1/32" |
| Species B | 5/32" | 3.0/3.4 | 1/32" |
| Species C | 5/32" | .6 | 1/32" |

Lap welds in accordance with Species D and E of this invention were carried out with 20 gage chromized sheets on a single phase, 250 kv.-a., 60 cycle A.C. mashed seam welding machine.

Continuous butt welds were also produced in accordance with the techniques of Species B and C by utilizing high frequency (450 kc.) resistance welding apparatus to localize the heat affected zone and thereby reduce the size of the upset portion of the weld. However, in Species B the ferrochromium was dispensed from a vibrating container directly on the top of adjacent edges of the heated sheets just prior to welding and it was not necessary to use masking tape to support the powder. The weldments produced by the high frequency resistance welding apparatus and the mashed seam apparatus were similar in all respects to the weldments produced by the flash welding apparatus.

Samples of chromized sheets flash welded in the manner shown in Table IV were subjected to tensile tests, 180° flat bend tests and immersed in boiling 20% nitric acid to test the continuity of the coating across the weld. Inasmuch as upsetting of the heat affected zone added reinforcement to the weld it was not entirely unexpected that all the tensile test fractures occurred in the base metal outside the heat affected zone of the weld and at the same strength as the base metal. Specimens representing each method of welding passed a 180° flat bend test without any indication of cracks. None of the specimens representing the various species of resistance welding of this invention showed any indication of attack in the area of the butt weld when immersed in boiling 20% nitric acid, while all of the specimens representing the conventional methods of resistance welding showed evidence of attack in the area of the weld. These results show that chromized sheets resistance welded by the welding method of this invention have properties comparable to those of the original coated sheets.

All of the methods of welding described above produce products having essentially the same quality on the basis of test results; however, Species A is the preferred embodiment because of its simplicity under our particular conditions. These methods of welding are also applicable to sheets whose thicknesses and coatings are different than the 20 gage chromized sheets used as examples.

The previously mentioned examples of process, base metal compositions, coating materials, and weld additions are intended to be merely illustrations of conditions and materials which are known to be satisfactory and are not intended to limit the scope of this invention which is defined in the following claims:

We claim:
1. Method of forming a corrosion resistant weld between sheets comprising a carbon steel base having thereon a coating of a corrosion resistant metal, which method comprises:
   (a) increasing the proportion of corrosion resistant metal to the base along the edges to be welded, and
   (b) resistance welding the edges to each other.
2. Method of forming a corrosion resistant weld between sheets comprising a carbon steel base having thereon a coating of a corrosion resistant metal, which method comprises:
   (a) removing a portion of the base along the edges to be welded, while retaining the coating metal therealong, and
   (b) resistance welding the edges to each other.
3. The method of claim 2 wherein (a) comprises acid etching to remove a portion of the base and leave the coating essentially intact.
4. The method of claim 1 wherein (a) comprises adding a powder containing corrosion resistant metal between and/or along the edges to be welded to each other.
5. The method of claim 1 wherein (a) comprises adding a rod containing corrosion resistant metal between and along the edges to be welded to each other.
6. Method of forming a corrosion resistant butt weld between sheets comprising a carbon steel base having thereon a coating of a corrosion resistant metal, which method comprises:
   (a) increasing the proportion of corrosion resistant metal to the base along the edges to be welded, and
   (b) flash welding the edges to each other.
7. Method of forming a continuous corrosion resistant butt weld between sheets comprising a carbon steel base having thereon a coating of a corrosion resistant metal, which method comprises:
   (a) increasing the proportion of corrosion resistant metal to the base along the edges to be welded, and
   (b) high frequency resistance welding the edges to each other.
8. Method of forming a corrosion resistant lap weld between sheets comprising a carbon steel base having thereon a coating of a corrosion resistant metal, which method comprises:
   (a) increasing the proportion of corrosion resistant metal to the base along the edges to be welded, and
   (b) resistance welding the overlapped edges.
9. The method of claim 1 wherein the corrosion resistant metal is chromium.
10. The method of claim 1 wherein the corrosion resistant metal is copper.
11. The method of claim 1 wherein the corrosion resistant metal is nickel.

References Cited

UNITED STATES PATENTS

| | | | |
|---|---|---|---|
| 1,414,822 | 5/1922 | Ledwinka | 219—83 |
| 2,819,381 | 1/1958 | Lindow et al. | 219—104 |
| 3,228,103 | 1/1966 | Shewmon | 29—497.5 XR |
| 1,881,733 | 10/1932 | Lewis | 219—104 X |
| 2,798,843 | 7/1957 | Slomin et al. | 219—118.1 X |
| 2,821,619 | 1/1958 | Rudd | 219—107 |

JOSEPH V. TRUHE, Primary Examiner

L. A. SCHUTZMAN, Assistant Examiner

U.S. Cl. X.R.

219—105, 118